US009311332B2

(12) United States Patent
Wang et al.

(10) Patent No.: US 9,311,332 B2
(45) Date of Patent: Apr. 12, 2016

(54) CLUSTER SHARED VOLUME REPLICATION

(71) Applicant: CA, Inc., Islandia, NY (US)

(72) Inventors: Xiaopin Wang, Beijing (CN); Ran Shuai, Beijing (CN); Shisheng Liu, Beijing (CN); Alexey Shvechkov, Natick, MA (US)

(73) Assignee: CA, Inc., New York, NY (US)

( * ) Notice: Subject to any disclaimer, the term of this patent is extended or adjusted under 35 U.S.C. 154(b) by 198 days.

(21) Appl. No.: 13/736,615

(22) Filed: Jan. 8, 2013

(65) Prior Publication Data

US 2014/0195484 A1 Jul. 10, 2014

(51) Int. Cl.
*G06F 17/30* (2006.01)
*G06F 9/455* (2006.01)
*G06F 11/14* (2006.01)

(52) U.S. Cl.
CPC ...... *G06F 17/30215* (2013.01); *G06F 9/45558* (2013.01); *G06F 11/1446* (2013.01); *G06F 17/30144* (2013.01)

(58) Field of Classification Search
CPC ............... G06F 17/30144; G06F 17/30088
USPC ........... 707/639; 711/161, 162; 717/127, 130; 719/321, 327
See application file for complete search history.

(56) References Cited

U.S. PATENT DOCUMENTS

| 6,389,459 | B1 * | 5/2002 | McDowell ..................... 709/216 |
| 2010/0070726 | A1 * | 3/2010 | Ngo et al. ..................... 711/162 |
| 2011/0276573 | A1 | 11/2011 | Wang | |
| 2012/0136827 | A1 | 5/2012 | Wang | |
| 2012/0197844 | A1 | 8/2012 | Wang | |
| 2012/0233123 | A1 * | 9/2012 | Shisheng et al. .............. 707/639 |

OTHER PUBLICATIONS

Nagar, Filter Manager, 2003.*
SIOS, Mirroring with SteelEye DataKeeper for Linux, 2012.*
SIOS, Setup of Cluster Shared Volumes, Nov. 30, 2012.*
Microsoft, Load Order Groups and Altitudes for Minifilter Drivers, Apr. 17, 2012.*

* cited by examiner

*Primary Examiner* — William Spieler
(74) *Attorney, Agent, or Firm* — Pillsbury Winthrop Shaw Pittman LLP

(57) ABSTRACT

Systems and methods for replicating input-output (I/O) events of a cluster shared volume (CSV) are presented. Such systems may include a cluster device or node (in a cluster of devices), a coordinator node, and a replica server. Replication techniques disclosed herein may include capturing, using a processor operatively associated with a cluster device, a direct I/O event generated at the cluster device (e.g., by a virtual machine). A legacy file system filter driver of the cluster device may be used and enabled to perform the capturing of the direct I/O event. The legacy file system filter driver may be different than a CSV filter driver associated with the CSV, and may be enabled after the CSV filter driver is enabled. The captured direct I/O event may then be transmitted to the replica server using, e.g., a replication filter, to maintain a backup copy of the event at the replica server.

21 Claims, 2 Drawing Sheets

US 9,311,332 B2

CLUSTER SHARED VOLUME REPLICATION

BACKGROUND

Cluster shared volumes (CSV) introduced in Windows 2008 R2 is a feature that simplifies the configuration and management of Hyper-V virtual machines (VM) in failover clusters. With CSV, on a failover cluster that runs Hyper-V, multiple virtual machines can use the same disk yet fail over (or move from node to node) independently of one another. CSV provides increased flexibility for volumes in clustered storage—for example, it allows you to keep system files separate from data to optimize disk performance, even if the system files and the data are contained within virtual hard disk (VHD) files. CSV may also provide performance improvements for the live migration process for clustered virtual machines.

BRIEF SUMMARY

In some implementations, there are provided systems and methods for data backup and recovery. In some implementations, there are provided systems and methods for backup and replication of data and events related to a cluster shared volume.

In some implementation, there is provided systems and methods for data replication related to a cluster shared volume. The data replication may occur from one or more master servers or cluster devices (e.g., production servers coupled to a cluster shared volume) to one or more replica servers (e.g., backup servers).

In some implementations, there is provided a system to replicate input-output (I/O) events related to a cluster shared volume (CSV). The system includes a replica server, a coordinator device, and a cluster device. The cluster device may be configured to capture a direct I/O event associated with the cluster shared volume, e.g., using a legacy file system filter driver of the cluster device. The direct I/O event may be generated at the cluster device, e.g., by a virtual machine thereof. The legacy file system filter driver used to capture the direct I/O event may be different than a CSV filter driver at the cluster device, which is associated with the cluster shared volume. The legacy file system filter driver may be enabled at the cluster device after the CSV filter driver is enabled. In some implementations, the captured direct I/O event to the replica server is transmitted using a replication filter at the cluster device.

In some implementations, the cluster device is further configured to transmit, using the CSV filter driver, metadata related to the direct I/O event at the cluster device to the coordinator device. Further, the cluster device may be further configured to transmit the metadata to the replica server using the replication filter. Similarly, the coordinator device may be configured to transmit the metadata to the replica server. In some implementations, the replica server is configured to consolidate a plurality of direct I/O events based on the metadata received from the cluster device and the coordinator device.

In some implementations, the coordinator device includes a volume snapshot service which is configured to generate a structure snapshot of the cluster shared volume, and the coordinator device is further configured to synchronize with the replica server using the volume snapshot service.

In some implementations, there is provided a method for replicating input-output (I/O) events of a cluster shared volume (CSV). The method may include a plurality of operations, and functions performed by the cluster device, the coordinator device, and the replica server of the replication system described herein.

In some implementations, there is provided a tangible computer readable storage media having computer or processor-executable instructions thereon, that when executed by one or more processing devices, may configure the one or more processing devices to perform one or more of the features and functions described herein.

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION

CSV typically employs a CSV mini-filter ("CSVFilter.sys") to handle file metadata redirection and direct input-output (I/O) operations. However, because the altitude of the CSV mini-filter in the I/O is higher than the altitude of mini-filters for replication software and the CSV mini-filter completes direct I/O operations in its pre-write callback, the direct I/O events to a CSV may be not be captured by the replication software. Further, typically there are multiple paths to pass I/O events to CSV simultaneously. For example, a VM host may write direct I/O to CSV directly, whereas file metadata I/O events may be passed to the CSV by a CSV coordinator. Moreover, several VM host nodes supporting a same VM may write direct I/O to the same CSV, if their VM images are configured on the same volume in the CSV. As such, replicated events (related to the same VM and the same CSV) may include one or more duplicated events, and the replicated events may not be properly sorted.

Thus, to address one or more of the above-discussed problems, it is desirable, for example, to develop and provide an improved replication and event sorting process for virtual machines that are hosted on different cluster nodes but use the same CSV.

In some implementations, there is provided systems and methods for data replication related to a cluster of computing devices or nodes (e.g., servers) that are coupled to a cluster shared volume (CSV), e.g., via one or more networks. In general, Cluster Shared Volumes are available in versions of Windows Server™ 2008 R2 and of Microsoft™ Hyper-V™ Server 2008 R2 that include the Failover Clustering feature. Volumes that are configured as Cluster Shared Volumes can be accessed by all nodes of a failover cluster. Each node can open and manage files on the volumes. Therefore, different nodes can host different virtual machines that all have files on the same volume. Without CSV, a failover cluster allows a given disk to be accessed by only one node at a time. Given this constraint, each Hyper-V virtual machine (VM) in the failover cluster has its own set of disks in order to be migrated or fail over independently of other virtual machines. Accordingly, the number of logical unit numbers (LUNs) may need to be increased with the addition of each virtual machine, which makes management of disks and clustered virtual machines more complex. In contrast, on a failover cluster that uses CSV, multiple virtual machines that are distributed across multiple cluster nodes can all access their Virtual Hard Disk (VHD) files at the same time, even if the VHD files are on a single disk in the storage. The clustered virtual machines can all fail over independently of one another.

Figure 1:
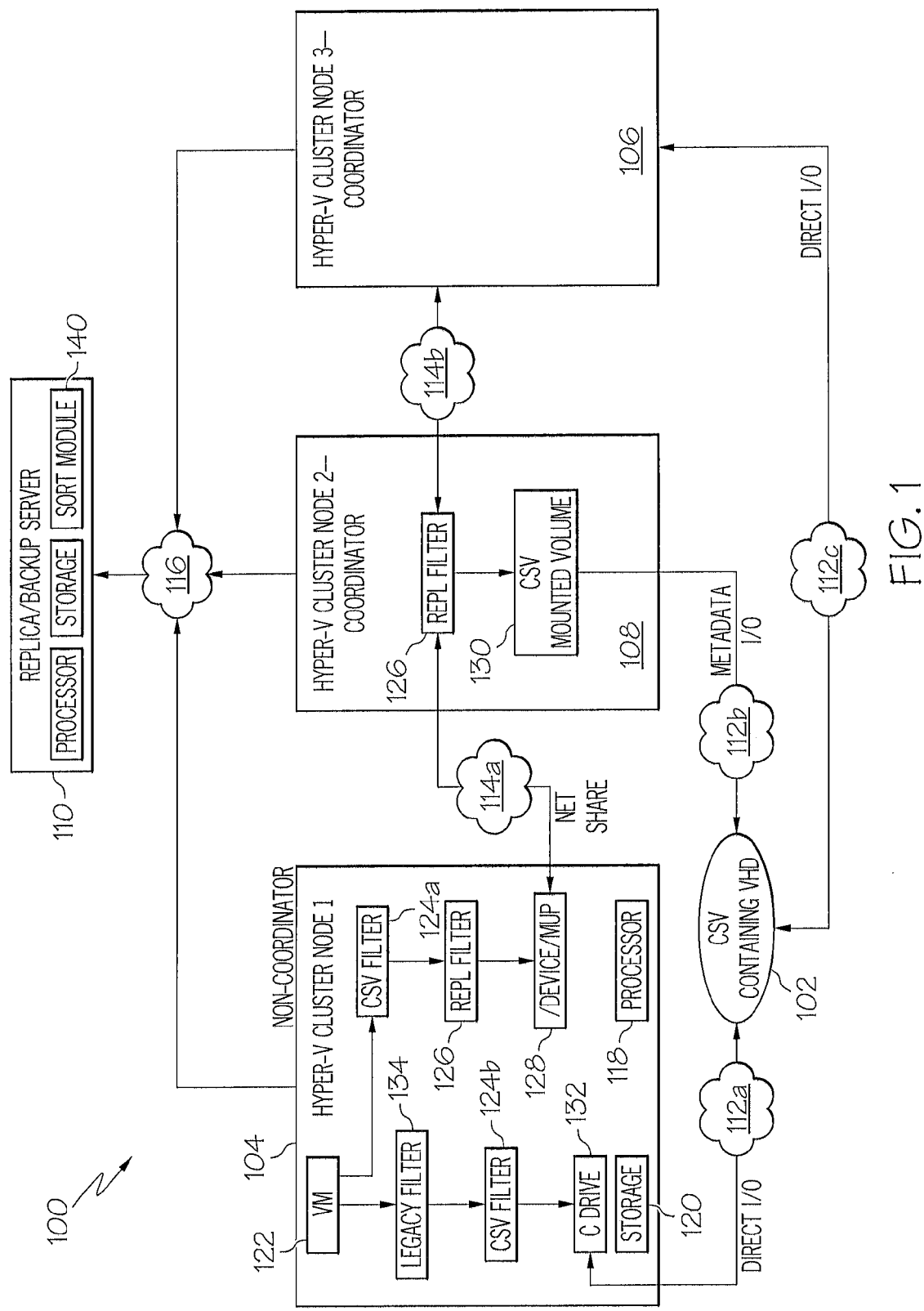
FIG. 1 illustrates an example of an environment that includes a system for performing data replication, according to various implementations.

FIG. 1 illustrates an example of an environment 100 in which a system for performing data replication for a cluster shared volume resides. As depicted in FIG. 1, environment 100 includes a system for replicating data of a CSV 102 associated with a cluster of computing devices 104, 106, 108. The cluster may include at least one coordinator (e.g., device 108) and/or at least one non-coordinator (e.g., devices 104, 106). Moreover, one or more of the devices 104, 106, 108 may include (or may be configured as) a master server from where the data and/or related events that are to be replicated originate. Data associated with CSV 102 from devices 104, 106, 108 may be sent to a replica or backup server 110 for replication.

Computing devices 104, 106, 108 may be communicatively connected with each other, with CSV 102, and with replica server 110 via one or more networks, or those connections may be established directly. For example, as shown, devices 104, 106, 108 may be connected to CSV 102 via networks 112a, 112b, 112c. Device 104 may be connected device 108 via network 114a, and device 106 may be connected to device 108 via network 114b. Further, devices 104, 106, 108 may be connected to replica server 110 via network 116.

In some implementations, networks 112, 114, 116 may include the Internet and/or other networks (e.g., Storage Area Network (SAN)). It will be appreciated that this is not intended to be limiting, and that the scope of this disclosure includes implementations in which CSV 102, devices 104, 106, 108, and replica server 110 are operatively linked via some other communication methodology, e.g., via a direct wired or wireless connection. In some implementations, environment 100 may include one or more other elements such as, but not limited to, servers, desktops, laptops, workstations, wireless devices (e.g., smartphones, personal digital assistants, etc.), routers, switches, and/or other network or other devices. Although only one computing device cluster, one replica server, and one CSV are shown in FIG. 1, this is for illustrative purposes only. In some implementations, there may be a plurality of device clusters, a plurality of replica servers and/or a plurality of CSVs, that may be connected via one or more networks, or otherwise connected to one another.

In some implementations, one or more of computing devices 104, 106, 108 are configured as a Hyper-V virtualization system represented by system 200 (in FIG. 2) supporting one or more virtual machines (VM) coupled to CSV 102. System 200 may include physical hardware 202, e.g., one or more processors 118 and one or more storage elements 120, and a Hyper-V Hypervisor 204. Hyper-V Hypervisor 204 may be configured to manage a parent partition 206, and one or more child partitions 208. Parent partition 206 may execute a host operating system and a virtualization stack. The virtualization stack runs in the parent partition 206, and has direct access to the physical hardware 204. Parent partition 206 may create one or more child partitions that each hosts a guest operating system. For example, in the implementation illustrated in FIG. 2, parent partition 206 may create child partition 208 that executes a guest operating system, e.g., using a hypercall application programming interface (API).

A virtualized partition (e.g., child partition 208) may not have access to physical processor(s) 118, and may not handle real interrupts. Instead, child partition 208 may have a virtual view of the processor(s) and may run in a guest virtual address space. Depending on configuration, hypervisor 204 may not use an entire virtual address space at the computing device. Hypervisor 204 may instead expose a subset of the address space of the processor(s) to child partition 208. Hypervisor 204 may handle interrupts to the processor(s) and may redirect the interrupts to the appropriate child partition using a logical Synthetic Interrupt Controller (SynIC). Address translation between various guest virtual address spaces may be hardware accelerated by using an IO Memory Management Unit (IOMMU) that operates independently of memory management hardware used by the physical processor(s).

Child partition 208 may not have direct access to physical hardware 202. Instead, child partition 208 may have a virtual view of physical hardware 202 (e.g., in terms of virtual devices). A request to the virtual devices may be redirected via a VMBus to devices in parent partition 206 that manages the requests. The VMBus may be a logical channel that enables inter-partition communication (e.g., communication between parent partition 206 and child partition 208). A response may also be redirected via the VMBus. If the devices in parent partition 206 are also virtual devices, the response may be redirected further within parent partition 206 in order to gain access to physical hardware 202. Parent partition 206 may execute a Virtualization Service Provider (VSP), connected to the VMBus, to handle device access requests from child partition 208. Child partition virtual devices may internally execute a Virtualization Service Client (VSC) to redirect requests to VSPs in parent partition 206 via the VMBus. The access process may be transparent to the guest operating system(s) in child partition 208.

In some implementations, storage 120 comprises electronic storage media that electronically stores information. Such electronic storage media may be provided integrally (i.e., substantially non-removable) to the associated device (e.g., device 104, 106 or 108) and/or as removable storage that is removably connectable to the associated device via, for example, a port (e.g., a USB port, a firewire port, etc.) or a drive (e.g., a disk drive, etc.). Storage unit 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

In some implementations, processor 118 may be configured to provide information processing capabilities in the associated device (e.g., device 104, 106 or 108). As such, processor 118 may include one or more of a digital processor, an analog processor, a digital circuit designed to process information, an analog circuit designed to process information, a state machine, and/or other mechanisms for electronically processing information. Although processor 118 is shown in FIG. 1 as a single entity, this is for illustrative purposes only. In some implementations, processor 118 may include a plurality of processing units. These processing units may be physically located within the same device or computing platform, or processor 118 may represent processing functionality of a plurality of devices operating in coordination. Although, processor 118 and storage 120 are shown as part of device 104, this is for illustrative purposes only. Each of devices 106, 108 may also include one or more processors (e.g., processor 118) and one or more storage units (e.g., storage 120).

As discussed above, devices 104, 106, 108 each may be configured as a Hyper-V virtualization system 200 coupled to CSV 102. Data objects to be backed-up or replicated (e.g., periodically, on-demand or in response to a change detected in a data object) to ensure that critical applications and data are available during outages, or live migration of associated virtual machines. Outages and/or VM migrations may be planned (e.g., as part of system maintenance), or unplanned (e.g., due to human error, viruses and other malware and natural disasters). Data objects considered for replication may include or may be associated with data items operated on or updated by one or more components or functions of devices 104, 106, 108. Such data items may include data files, file systems, directories (or folders), logical volumes, database entities, or other data items stored in the associated storages of the computing devices.

In some implementations, device 104 (and device 106, although not shown) includes VM 122, CSV filters 124, and replication filter 126. VM 122 may be configured to originate file I/O events and operations associated with CSV 102. The metadata I/O data, e.g., create, close, rename, remove and format virtual hard drive (VHD) events through lots of writes may be passed through CSV filter 124a and then to a "/Device/Mup" folder 128 of devices 104, 106 to the CSV coordinator node (e.g., device 108), e.g., via network share (e.g., network 114a, 114b). Coordinator 108 may be configured to further forward the metadata I/O events to a CSV mounted volume 130, passing through the file system (not shown) of device 108. The metadata I/O events are then forwarded from CSV mounted volume 130 to the associated VHD in CSV 102, e.g., via network 112b.

On the other hand, direct I/O events from VM 122 are passed to C drive 132 of device 104, 106 (e.g., to a folder indicated by the path "C:\ClusterStorage\"), and intercepted by CSV filter 124b. CSV filter 124b may be configured to subsequently route the direct I/O events to CSV 102 directly (bypassing the file system of device 104, 106), e.g., via network 112a, 112c. Accordingly, because CSV filter 124b bypasses the file system to pass the direct I/O events to CSV 102, it may not be possible to attach any filter at a lower altitude (i.e., the unique identifier in the I/O stack as defined by Microsoft) than that of CSV filter 124b to capture those direct I/O events. Moreover, since it may also not be possible to use or attach a mini-filter at a higher altitude than CSV filter 124b to capture the direct I/O events, a legacy file system filter driver 134 may be used to capture CSV-related direct I/O events and send the captured events for replication to replica server 110.

In some implementations, legacy filter 134 is attached to C drive 132 after CSV filter 124b is attached; otherwise, filter manager may attach a new frame for calling back CSV filter 124b at a higher altitude than that of legacy filter 134. One or more of the direct I/O events to CSV may be passed to a reparse point under C drive, i.e., C:\ClusterStorage\ of, e.g., device 104. So, in some embodiments, when legacy filter 134 determines that an event path is under C:\ClusterStorage\, legacy filter 134 determines that the event or operation is a direct I/O operation that should be replicated. In some embodiments, a replication or master engine of device 104, 106 attaches legacy filter 134 to CSV filter 124b at a specific timing, e.g., when the replication engine detects whether CSV filter 124b is loaded with events. If a VM is hosted on coordinator 108, the metadata I/O events may still be passed to CSV 102 via CSV mounted volume 130, and the direct I/O events may be sent to CSV 102 via C drive (e.g., C drive 132) of device 108.

In some implementations, to capture and replicate CSV-related metadata I/O events from devices 104, 106, 108 to replica server 110, replication mini-filter 126 is attached to the \Device\Mup folder. On coordinator 108, replication filter 126 may be attached to CSV mounted volume 130 for capturing metadata I/O events issued from every VM host device, e.g., devices 104, 106 as well as device 108, if a VM is running thereon. Additionally, legacy filter 134 may optionally be attached to C drive of device 108, if a VM is hosted on device 108 to capture the direct I/O events. All the direct I/O and metadata events captured by legacy filters 134 and replication filters 126 may be sent to replica server 110 for synchronization and backup.

In some implementations, replication filter 126 and/or legacy filter 134, to perform replication operations, may include one or more components, modules, or application described in detail in U.S. patent application Ser. No. 12/955,299, entitled "Periodic Data Replication," and U.S. patent application Ser. No. 13/018,934, entitled "Block Level Data Replication," contents of each of which are incorporated by reference herein in their entireties. For example, replication filter 126 and/or legacy filter 134 may include, among other components, one or more of a snapshot module, a synchronization module, a file system driver (FSD) module, and a change manager functions and configurations of each of which are described in detail in the aforementioned patent applications.

In some implementations, devices 104, 106, 108 (e.g., using replication filter 126 and/or legacy filter 134) may be configured to synchronize the contents of CSV 102 with replica server 110, before performing the above-described capturing and replication of direct I/O and metadata I/O events. For example, the synchronization process may be initiated by replication filter 126 in coordinator 108 by generating Volume Snapshot Service (VSS) snapshots for CSV 102. VSS may only be supported in coordinator 108. Further, replication filter 126 may build directory structures from the VSS snapshots, and immediately release the snapshots. The directory structures, together with the existing directory structures in replica server 110, may be used to compare the differences between CSV and root directories in replica server 110. During synchronization, some files may be renamed or removed, which may be identified by replication mini-filter 126 in coordinator 108. Accordingly, replication filter 126 may further notify replica server 110 to remove the (removed) file, or synchronize the renamed file followed by a "rename" event.

In some implementations, replica server 110 may be configured as a backup server for the cluster of devices associated with CSV 102 and may include a storage, a processor, and other elements. The storage units at replica server 110 may be similar to or different than the storage units, e.g., storage unit 120 of devices 104, 106, 108. Replica server 110 may further include various components (not depicted in FIG. 1) such as user interfaces, processors, and so forth. Components similar to one or more of the components described above with respect to devices 104, 106, 108 (e.g., storage unit 120, and processor 112) may be part of replica server 110. Such components may be used for the same or different functions as described above for devices 104, 106, 108.

After an initial backup and replication (i.e., synchronization) of data of CSV 102, the captured direct I/O and metadata I/O events from various devices of the cluster of devices (e.g., devices 104, 106, 108) may be consolidated. The recorded events may be consolidated at devices 104, 106, 108, for example, using techniques described in U.S. patent application Ser. No. 12/775,066, entitled "Journal Event Consolidation," which is incorporated by reference herein in its entirety. In some implementations, the operations or events are recorded at the cluster device without recording the data associated with the operations (i.e., changes to the data items). However, data blocks or files affected by the operations may be identified at the cluster device, and the identified data blocks may be processed to generate representative data blocks, which may be sent to replica server 110 along with or after sending the consolidated event(s). This mechanism of using representative data blocks (that represent the modified or affected data blocks) in conjunction with the consolidated events to replicate data or update replicated data may reduce data redundancy in the replication process. As such, replication and recovery speed may be increased, and CPU usage and network overhead may be reduced. Other replication techniques may be implemented.

However, in some implementations, since replica server may receive I/O events for a single VM from several devices of the device cluster considering that the VM may be live migrated across multiple cluster devices repeatedly, the captured I/O events for that VM may be consolidated and sorted at replica server 110 itself (e.g., using sorting module 140). The time points directly associated with the captured I/O events on each cluster device or host may not be suitable to sort the I/O events from various cluster devices at replica server 110 as the time scale and/or clock at each cluster device may not be synchronized.

Alternatively, some of the metadata I/O events (e.g., create, set-information, close and write events for formatting VHD of CSV 102) received at replica server 110 may be used to create "time marks" or "temporal indicators" to consolidate and sort events at replica server 110. For example, Hyper-V at cluster node 104 creates a new VHD in CSV 102. This "create" event for the CSV VHD may be captured by both replication filters 126 in VM node 104 and coordinator 108 and sent to replica server 110. Sorting module 140 at replica server 110 may be configured to match these "create" events from VM node 104 and coordinator 108 to combine multiple sequences of events into a single sequence.

For example, consider a non-limiting live migration event sequence in which, first, VM host 104 including VM 122 issues many direct I/O events to CSV 102 before a final "close" event. Then VM 122 is live migrated from VM host 104 to VM host 106, which will issue a "create" event to create a VHD in CSV 102 for the migrated VM. This create event from host 106 may be followed by one or more "write" events generated by host 106 as host 106 accesses and writes data to CSV 102. In this live migration process, coordinator 108 may receive the (metadata I/O) "close" event from host 104, and "create" event from host 106. Sorting module 140 may be configured to match the close event received for host 104 and coordinator 108, thus generating a first time mark indicating ceasing of CSV operations from the VM of host 104 (in the live migration process). At the same time, sorting module 140 may be configured to match the create event from host 106 and coordinator 108, thus generating a second time mark indicating commencement of CSV operations from the VM of host 106 (also in the live migration process). Accordingly, using these two time marks or temporal indicators based on the matching of the received metadata I/O events, sorting module 140 may determine the order for events, e.g., in the live migration process. For example, based on the time marks, sorting module 140 may determine that all the write events before the time mark corresponding to the close event in host 104 should be sequenced in replica server 110 ahead of all the write events after the time mark corresponding to the create event in host 106. Thus the final combined event sequence recorded at replica server 110 may include all write events in host 104, the close event at host 104, the create event at host 106, and all write events in host 106—in that order.

Figure 2:
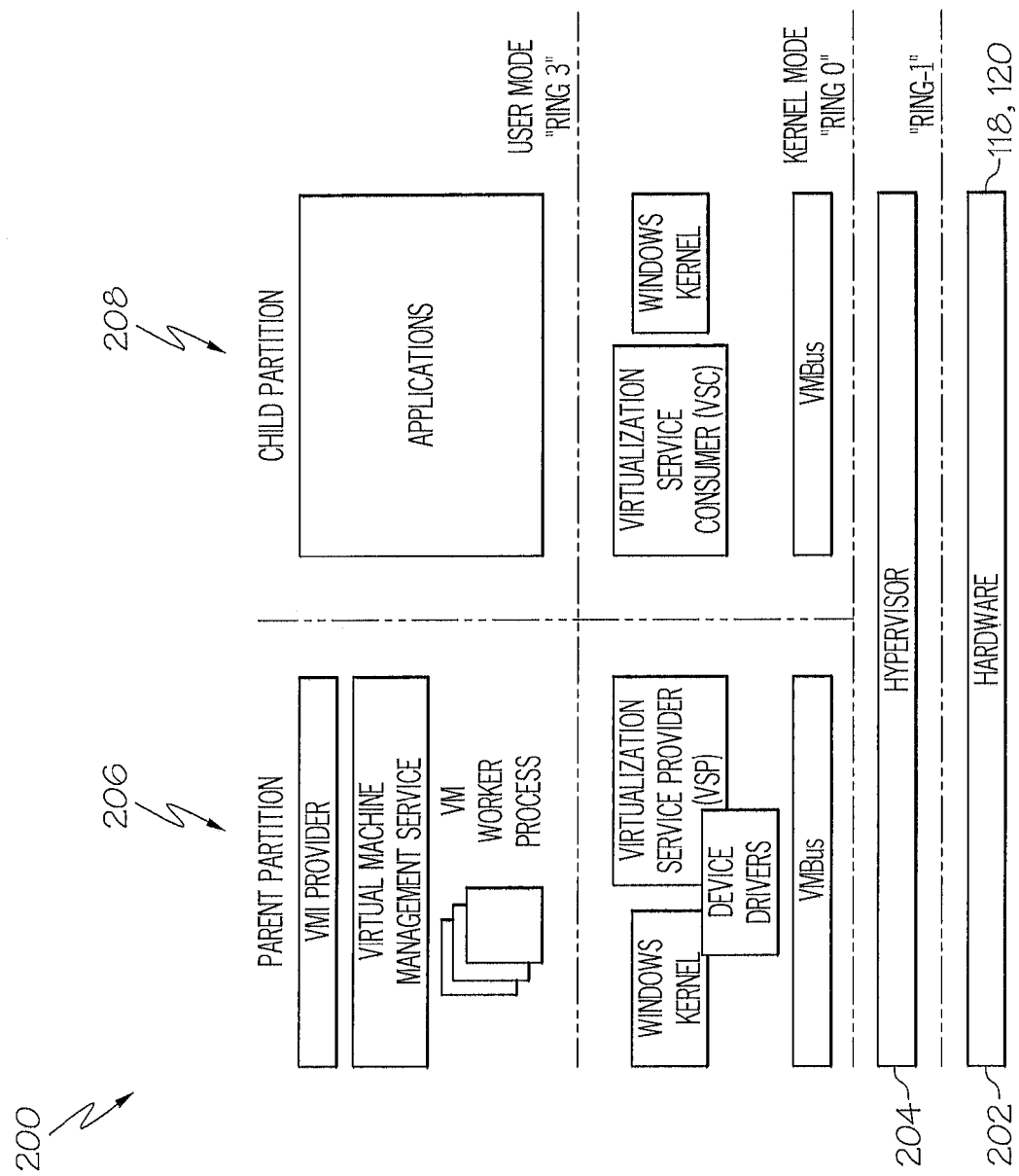
FIG. 2 illustrates an example of a virtualization system according to various implementations.

It should be appreciated that various modules illustrated in FIG. 1 and FIG. 2 may be located remotely from the other modules. The description of the functionality provided by the different modules described above is for illustrative purposes, and is not intended to be limiting, as any of the described modules may provide more or less functionality than is described. Further, one or more processors, e.g., of devices 104, 106, 108 may be configured to execute one or more additional modules that may perform some or all of the functionality attributed to the modules described above.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A method to replicate input-output (I/O) events of a cluster shared volume (CSV), the method comprising:

capturing, using a processor operatively associated with a cluster device, a direct I/O event associated with the cluster shared volume, the direct I/O event generated at the cluster device and captured using a legacy file system filter driver of the cluster device, wherein the legacy file system filter driver is different than a CSV filter driver at the cluster device, the CSV filter driver associated with the cluster shared volume;

enabling the legacy file system filter driver at the cluster device after the CSV filter driver is enabled; and transmitting, using the processor, the direct I/O event from the cluster device to a replica server using a replication filter at the cluster device, wherein the replication filter is different than the legacy file system filter driver.

2. The method of claim 1, further comprising transmitting metadata related to the direct I/O event to a coordinator device.

3. The method of claim 2, wherein the coordinator device comprises a volume snapshot service which is configured to generate a structure snapshot of the cluster shared volume, and the coordinator device is configured to synchronize with the replica server using the volume snapshot service.

4. The method of claim 1, further comprising transmitting metadata related to the direct I/O event to the replica server.

5. The method of claim 4, wherein the transmitting metadata comprises transmitting the metadata to the replica server via a coordinator device.

6. The method of claim 5, wherein the replica server is configured to consolidate a plurality of direct I/O events based on metadata received from the cluster device and the coordinator device.

7. The method of claim 1, wherein the cluster device comprises a virtual machine and the direct I/O event is generated by the virtual machine.

8. A system to replicate input-output (I/O) events related to a cluster shared volume (CSV), the system comprising:
a cluster device configured to:
capture a direct I/O event, generated at the cluster device, associated with the cluster shared volume using a legacy file system filter driver of the cluster device, wherein the legacy file system filter driver is different than a CSV filter driver at the cluster device and the CSV filter driver is associated with the cluster shared volume,
enable the legacy file system filter driver after the CSV filter driver is enabled, and
transmit, using a replication filter at the cluster device, the captured direct I/O event to the replica server, wherein the replication filter is different than the legacy file system filter driver.

9. The system of claim 8, further comprising a coordinator device communicatively associated with the cluster device, wherein the cluster device is further configured to transmit, using the CSV filter driver, metadata related to the direct I/O event at the cluster device to the coordinator device.

10. The system of claim 9, wherein the cluster device is further configured to transmit, using the replication filter, the metadata to the replica server.

11. The system of claim 10, wherein the coordinator device is further configured to transmit the metadata to the replica server.

12. The system of claim 11, further comprising the replica server, wherein the replica server is configured to consolidate a plurality of direct I/O events based on the metadata received from the cluster device and the coordinator device.

13. The system of claim 9, wherein the coordinator device comprises a volume snapshot service which is configured to generate a structure snapshot of the cluster shared volume, and the coordinator device is further configured to synchronize with the replica server using the volume snapshot service.

14. The system of claim 8, wherein the cluster device comprises a virtual machine and the direct I/O event is generated by the virtual machine.

15. A computer program product comprising:
a non-transitory computer readable storage medium comprising computer readable program code embodied therewith to replicate input-output (I/O) events of a cluster shared volume (CSV), the computer readable program code comprising:
computer readable program code configured to capture, using a processor operatively associated with a cluster device, a direct I/O event associated with the cluster shared volume using a legacy file system filter driver of the cluster device, the direct I/O event generated at the cluster device, wherein the legacy file system filter driver is different than a CSV filter driver at the cluster device, the CSV filter driver associated with the cluster shared volume;
computer readable program code configured to enable the legacy file system filter driver at the cluster device after the CSV filter driver is enabled; and
computer readable program code configured to transmit, using a replication filter at the cluster device, the captured direct I/O event from the cluster device to a replica server, wherein the replication filter is different than the legacy file system filter driver.

16. The computer program product of claim 15, further comprising computer readable program code configured to transmit, using the CSV filter driver, metadata related to the direct I/O event at the cluster device to a coordinator device.

17. The computer program product of claim 16, further comprising computer readable program code configured to transmit, using the replication filter, the metadata to the replica server.

18. The computer program product of claim 17, wherein the coordinator device is configured to transmit the metadata to the replica server.

19. The computer program product of claim 18, wherein the replica server is configured to consolidate a plurality of direct I/O events based on the metadata received from the cluster device and the coordinator device.

20. The computer program product of claim 16, wherein the coordinator device comprises a volume snapshot service which is configured to generate a structure snapshot of the cluster shared volume, and the coordinator device is configured to synchronize with the replica server using the volume snapshot service.

21. The computer program product of claim 15, wherein the cluster device comprises a virtual machine and the direct I/O event is generated by the virtual machine.

* * * * *